(12) United States Patent
Betancourt

(10) Patent No.: US 6,975,093 B2
(45) Date of Patent: Dec. 13, 2005

(54) BATTERY SAVER

(76) Inventor: Rolando Betancourt, 1435 NW. 13th Terr., Miami, FL (US) 33125

( * ) Notice: Subject to any disclaimer, the term of this patent is extended or adjusted under 35 U.S.C. 154(b) by 279 days.

(21) Appl. No.: 10/695,005

(22) Filed: Oct. 28, 2003

(65) Prior Publication Data

US 2005/0088149 A1    Apr. 28, 2005

(51) Int. Cl.$^7$ ............................................. H01M 10/46
(52) U.S. Cl. ........................................................ 320/107
(58) Field of Search ........................ 320/107, 110, 114, 320/133, 135, 155

(56) References Cited

U.S. PATENT DOCUMENTS

| | | |
|---|---|---|
| 5,173,653 A | 12/1992 | Hochstein |
| 6,320,351 B1 * | 11/2001 | Ng et al. .................... 320/104 |
| 6,897,785 B2 * | 5/2005 | Corbus ........................ 320/115 |

* cited by examiner

Primary Examiner—Edward H. Tso
(74) Attorney, Agent, or Firm—Ruben Alcoba, Esq.; Laurence Edson, Esq.

(57) ABSTRACT

The present invention is directed to a circuit that is housed within a battery that preserves the chemical energy within a battery when an external load is accidentally left on. The circuit comprises of a momentary switch, a relay, a timer and a terminal, wherein the circuit is connected to the positive and negative electrodes of a battery. The circuit is described in the circuit diagram and functions in the following manner: (1) the momentary switch detects any movement outside of the battery and sends a pulse to the relay, wherein the pulse causes the relay to close, thereby allowing electricity to flow through the circuit to the load outside of the battery, simultaneously, the momentary switch will also trigger the timer to supply power to the circuit during a timing cycle, (2) when then timer's cycle is complete, the timer's output will go low and thereby cause the relay to open and halt the flow of electricity. The terminal would be connected to the positive electrode of the battery and would have a means for connecting to the external load.

Figure 1:
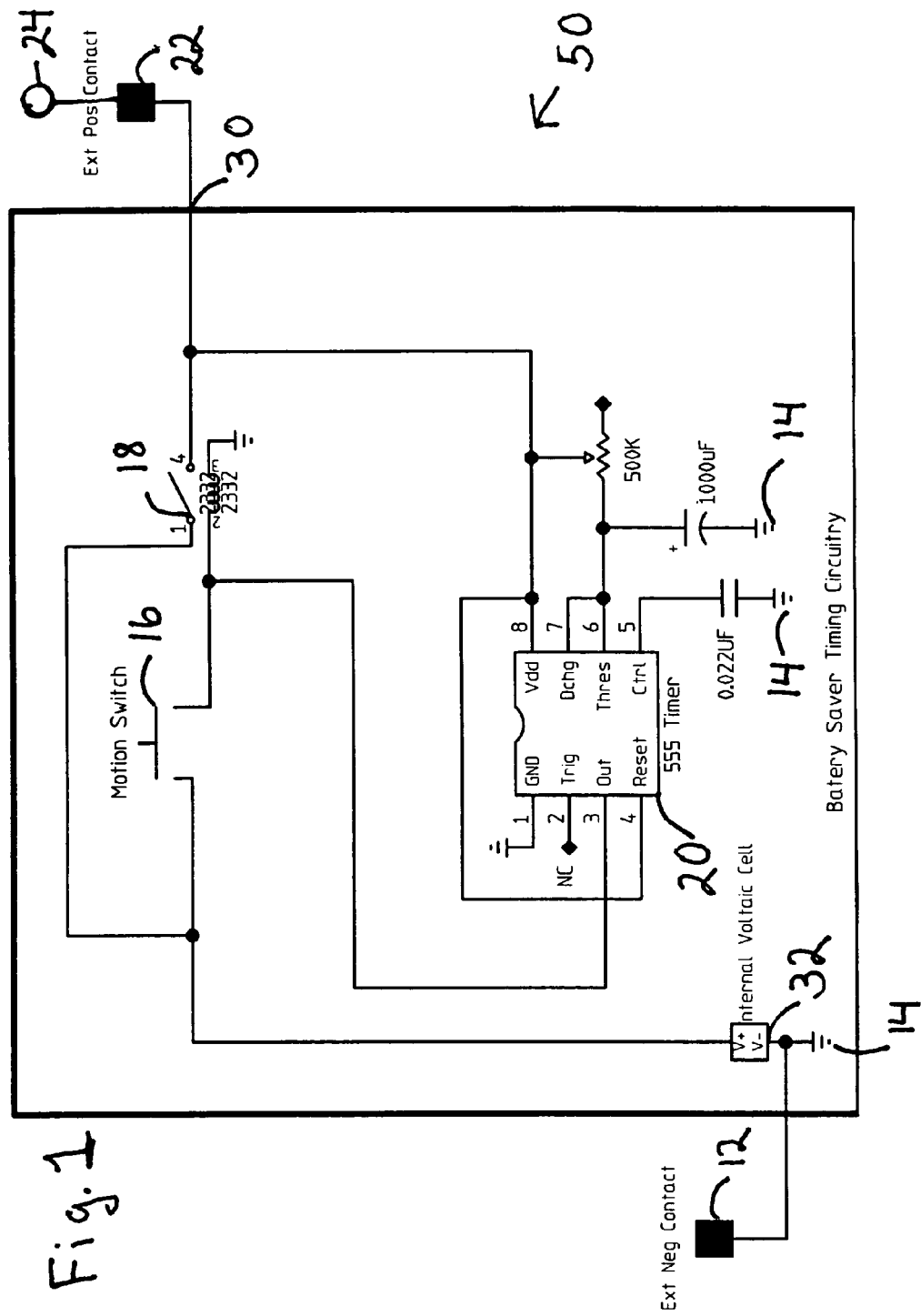

10 Claims, 2 Drawing Sheets

BATTERY SAVER

BACKGROUND

There is a need for a device that will prevent the waste of the chemical energy stored within a battery when a load connected to the battery is accidentally left open for an extended period of time.

Chemical energy stored within a battery will dissipate upon a load being attached to its terminals. The rate in which the energy dissipated will depend on how much voltage the load consumes. The load's consumption of electrical energy is controlled by the user of the device using the load. When the circuit between the load and the battery is closed the device will consume electrical energy until the circuit is opened.

The inventor of this invention conceived this invention by observing his children play with battery operated toys. He noticed that his children would not turn off their toys once they where turned on. He realized that it would be easier to develop a universal device that would open the circuit between a battery and a device connected to it, than to change his children's behavior.

He realized that there were two ways of addressing the problem. The first way is to install in every device a timing/activity switch that will monitor the device's activity and when the activity falls below a threshold, the switch shall open the circuit delivering the electrical energy to the device.

The second method for solving the problem is to install a circuit within the battery that has a timing switch and a motion detector/switch connected within. The circuit would be triggered on by any movement. Upon movement being detected by the motion switch of the device, the circuit would close and the circuit would allow the energy within the battery to flow to an external load (a toy or a flashlight). The timing switch would be calibrated to run for a certain period of time before triggering the circuit to open.

When researching the prior art, U.S. Pat. No. 5,173,653 disclosed a device that is to be placed between a load and a battery. The device is a timing switch that disconnects the current flow between the battery and the load upon a defined period of time. The Patent suffers from the fact that the timing switch triggers after a certain period of time, even if the device connected is still being used, and that the control circuit that activates the timer will always drain energy from the battery.

An object of the present invention is to provide a device that will save the chemical energy within a battery when the battery is connected to an outside load that is accidentally left on.

Another object of this invention is to provide a universal device that can be distributed to the public without having to change the space in which a battery is stored.

A further object of this invention is to prevent a timing switch from draining the chemical energy within the battery when the circuit is open.

Yet a further object of this invention is to provide a reliable battery saver device that is housed within the battery.

SUMMARY

The present invention is directed to a circuit that is housed within a battery that preserves the chemical energy within a battery when an external load is accidentally left on. The circuit comprises of a momentary switch, a relay, a timer and a terminal, wherein the circuit is connected to the positive and negative electrodes of a battery. The circuit is described in the circuit diagram and functions in the following manner: (1) the momentary switch detects any movement outside of the battery and sends a pulse to the relay, wherein the pulse causes the relay to close, thereby allowing electricity to flow through the circuit to the load outside of the battery, simultaneously, the momentary switch will also trigger the timer to supply power to the circuit during a timing cycle, (2) when then timer's cycle is complete, the timer's output will go low and thereby cause the relay to open and halt the flow of electricity. The terminal would be connected to the positive electrode of the battery and would have a means for connecting to the external load.

DRAWINGS

Figures 2A, 2B:
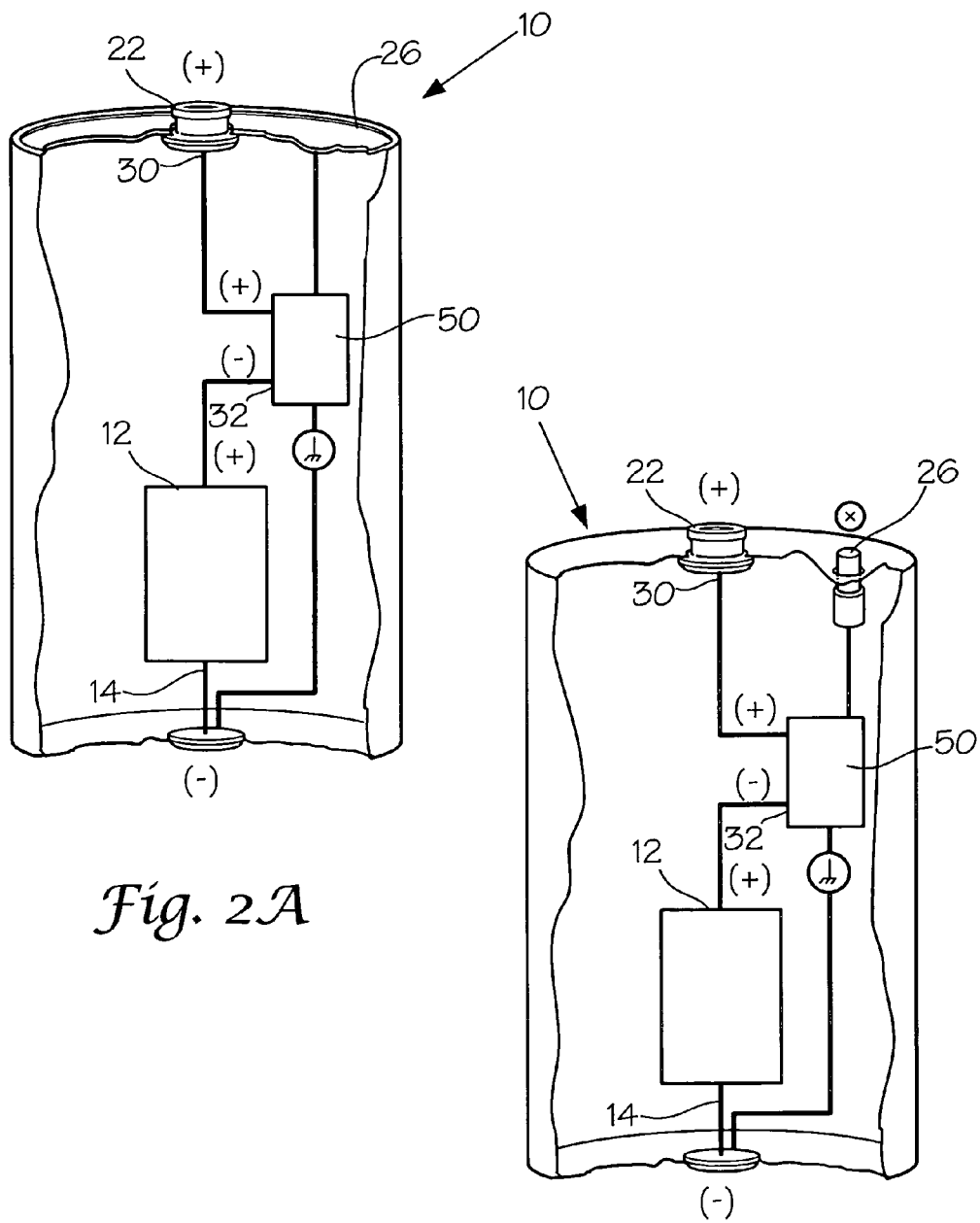

Other features and advantages of the invention will become more readily understood from the following detailed description taken in conjunction with the appended claims and the accompanying drawing, wherein:

FIG. 1 is a circuit diagram of the preferred embodiment of a battery saver device employing the invention; and FIG. 2a–b are side views of two embodiments of the invention showing the control means of the timer incorporated within a battery.

DESCRIPTION

As shown in the circuit diagram having a positive 30 and a negative end 32, a circuit 50 housed within a battery for controlling the flow of electricity to an external load, wherein the negative end of the circuit 32 is connected to a positive electrode of the battery 12 and the circuit 50 is grounded to the negative electrode of the battery 14, wherein the circuit 50 comprises a momentary switch 16 for detecting any movement outside of the battery 10, a relay 18 which is connected to the momentary switch 16, wherein the relay 18 receives a pulse from the momentary switch 16 when movement is detected by the momentary switch 16 and the relay is made to close 16, thereby allowing the flow of electricity, a timer 20 which is connected to the momentary switch and the relay, wherein the timer 20 is triggered on by a pulse from the momentary switch 16 when the momentary switch 16 first detects movement, and wherein the timer 20 will supply power to the circuit during a timing cycle, when cycle is complete, the output of the timer 20 will run low, which in turn will cause the relay 18 to open, thereby halting the flow of electricity through the circuit, a terminal 22 connected to the positive end of the circuit 30. The negative end 32 of circuit connects to the positive electrode 12 of the battery 10, and wherein the terminal 22 is a means for connecting to an external load 24.

In the preferred embodiment of the invention, the normal state of the momentary switch 16 is in the open position, and wherein detection of movement outside of the battery 10 would briefly close the momentary switch 16, thereby allowing the momentary switch 16 to send a pulse to desired locations.

In another embodiment of the invention the timer 20 will be calibrated to receive a pulse from the momentary switch 16 during a set range of time, thereby allowing timer 20 to reset its timing cycle. The pulse would be sent from the momentary switch 16 to a reset pin incorporated within the timer 20.

As seen in FIG. 2a–b, another embodiment of the invention shows the circuit integrated within the battery 10 and further comprising a control means 26 for allowing the user of the battery 10 to manually control the timing cycle of the circuit, wherein the control means 26 is connected to the timer 20. The control means 26 is a variable resister that can be manually set. In another embodiment, the control means 26 is a rotary dial incorporated into the external casing of the battery.

In the most rudimentary example of this invention, the circuit 50 works as follows. At time 0, the momentary switch 16 and the relay 18 are in the open position, thereby no electricity flows through the battery 10 to an outside load 24. At time 1, the momentary switch 16 detects movement outside of the battery 10 and temporarily connects to the circuit 50, thereby simultaneously sending a pulse to the timer 20 and the relay 18. The relay 18 then closes, thereby permitting electricity to flow to an outside source 24. The timer 20 simultaneously is activated to run for a set timing cycle in which the timer 20 supplies constant power to the relay 18 for the duration of the timing cycle, this in turn allows the relay 18 to stay closed during the timing cycle. At time 2, the output of the timer 20 goes low, the timing cycle has run, and the relay 16 is de-energized, thereby causing the relay 16 to open and halting the flow of electricity to an outside load 24. Time 2 of the of the cycle can be prolonged by allowing the timer 20 to receive a second pulse from the momentary switch 16 after a predetermined period, thereby resetting the timer's 20 timing cycle to its original duration. As long as movement occurs outside of the battery 10 during the timing cycle, the timer 20 remains on and the relay 18 remains closed.

When using the embodiment having the control means 26 on the outside of the battery 10, the user of the battery 10 manually sets the timing cycle of the timer 20 by adjusting the control means 26. The control means 26 can be manually set to different positions.

As seen in the circuit diagram, the circuit 50 employs transistors, capacitors, a momentary switch 16, and a timer 20. In the preferred embodiment of the invention, a 555 timer is used to control the timing cycle and to supply the power to the relay. Note, other timers can be used with this invention, so long as the timers accomplish the same functions as the 555 timer.

This battery saver circuit is to be incorporated within a standard sized battery. The battery shall be used as any other battery on the market. The battery's chemical energy shall be drained when attached to an outside load, and said load is turned on. This invention shall be used with toys or devices that are moved from one position to another. This invention is not intended for devices that are laid to rest in a fixed position.

The crux of this invention is that power will be supplied to an outside source for a predetermined period. The timer runs for a predetermined period and the momentary switch resets the period when movement is detected outside of the battery. If no movement is detected outside of the battery after the predetermined period, then the relay will be opened, thereby halting the flow of electricity to an outside load.

The timer is not activated until a pulse is received from the momentary switch, this feature of the invention preserves the chemical energy within a battery, for the timer does not drain any energy until it is activated.

An advantage of the present invention is that it provides a device that will save the chemical energy within a battery when the battery is connected to an outside load that is accidentally left on. This occurs when the timing cycle runs for its predetermined period and the momentary switch does not detect movement outside of the battery during that period. If no movement is detected then the relay switch is opened thereby halting the flow of electricity to an outside source.

Another advantage of this invention is that it provides a universal device that can be distributed to the public without having to change the space in which a battery is stored.

A further advantage of this invention is that it prevents a timing switch from draining the chemical energy within the battery when the circuit is open.

A last advantage of this invention is that it provides a reliable battery saver device that is housed within a battery.

Therefore, the forgoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A circuit housed within a battery for controlling the flow of electricity to an external load, wherein the circuit is connected to the positive and negative electrodes of the battery comprising:

a momentary switch for detecting any movement outside of the battery;

a relay which is connected to the momentary switch, wherein the relay receives a pulse from the momentary switch when movement is detected by the momentary switch and the relay is made to close, thereby allowing the flow of electricity;

a timer which is connected to the momentary switch and the relay, wherein the timer is triggered on by a pulse from the momentary switch when the momentary switch first detects movement, and wherein the timer will supply power to the circuit during a timing cycle, when cycle is complete, the output of the timer will run low, which in turn will cause the relay to open, thereby halting the flow of electricity to an external load; and a terminal connected to the end of the circuit connecting to the positive electrode of the battery, and wherein the terminal further comprises of a means for connecting to the external load.

2. The circuit of claim 1, wherein the timer will be calibrated to receive a pulse from the momentary switch during a set range of time, thereby allowing timer to reset its timing cycle.

3. The circuit of claim 2, further comprising a control means for allowing the user of the battery to manually control the timing cycle of the circuit, wherein the control means is connected to the timer.

4. The circuit of claim 3, wherein the normal state of the momentary switch is in the open position, and wherein detection of movement outside of the battery would briefly close the momentary switch, thereby allowing the momentary switch to send a pulse to desired locations.

5. The circuit of claim 1, wherein the normal state of the momentary switch is in the open position, and wherein detection of movement outside of the battery would briefly close the momentary switch, thereby allowing the momentary switch to send a pulse to desired locations.

6. The circuit of claim 5, wherein the timer will be calibrated to receive a pulse from the momentary switch during a set range of time, thereby allowing timer to reset its timing cycle.

7. The circuit of claim 6, further comprising a control means for allowing the user of the battery to manually control the timing cycle of the circuit, wherein the control means is connected to the timer.

8. The circuit of claim 1, further comprising a control means for allowing the user of the battery to manually control the timing cycle of the circuit, wherein the control means is connected to the timer.

9. The circuit of claim 8, wherein the timer will be calibrated to receive a pulse from the momentary switch during a set range of time, thereby allowing timer to reset its timing cycle.

10. The circuit of claim 9, wherein the normal state of the momentary switch is in the open position, and wherein detection of movement outside of the battery would briefly close the momentary switch, thereby allowing the momentary switch to send a pulse to desired locations.

* * * * *